US006006076A

United States Patent [19]

Nakamura

[11] Patent Number: 6,006,076

[45] Date of Patent: Dec. 21, 1999

[54] MOBILE FM-MULTIPLEX-BROADCAST RECEIVING DEVICE

[75] Inventor: Kazumasa Nakamura, Wako, Japan

[73] Assignee: Honda Giken Kogyo Kabushiki Kaisha, Tokyo, Japan

[21] Appl. No.: 08/898,475

[22] Filed: Jul. 22, 1997

[30] Foreign Application Priority Data

Jul. 29, 1996 [JP] Japan .................................... 8-231223

[51] Int. Cl.$^{6}$ ....................................................... H04B 1/18

[52] U.S. Cl. .................................... 455/186.1; 455/161.3; 455/184.1

[58] Field of Search ............................. 455/161.2, 161.3, 455/166.2, 154.2, 155.1, 158.1, 158.4, 158.5, 184.1, 185.1, 186.1

[56] References Cited

U.S. PATENT DOCUMENTS

| | | | |
|---|---|---|---|
| 5,220,682 | 6/1993 | Tomohiro | 455/161.2 |
| 5,475,874 | 12/1995 | Klos | 455/161.2 |
| 5,701,599 | 12/1997 | Aihara | 455/186.1 |
| 5,732,338 | 3/1998 | Schwob | 455/161.2 |
| 5,749,048 | 5/1998 | Masuda | 455/161.2 |
| 5,835,854 | 11/1998 | Palisson et al. | 455/186.1 |

*Primary Examiner*—Paul Loomis
*Attorney, Agent, or Firm*—Nikaido Marmelstein Murray & Oram LLP

[57] ABSTRACT

A mobile FM-multiplex-broadcast receiving device for receiving digital information (e.g., traffic information and general information) transmitted by FM-multiplex-broadcasts, which is capable of quickly obtaining a sufficient amount of necessary information by reliably selecting an optimally receivable FM-broadcasting station. This is realized by providing the receiving device with device for determining a correct reception ratio of digital information by calculating an amount of correctly received data to a total amount for each of FM-broadcasting stations and a driver for allowing a driver to select one of stations receivable with correct reception ratios greater than a certain preset value.

3 Claims, 4 Drawing Sheets

MOBILE FM-MULTIPLEX-BROADCAST RECEIVING DEVICE

BACKGROUND OF THE INVENTION

Recently, there has been developed such a mobile digital information system wherein a receiving device mounted in a vehicle receives traffic information (supplied by VICS—Vehicle Information and Communication System) or general information (e.g., news) transmitted as FM-multiplex broadcast from FM broadcasting stations and presents the received information on a screen of a navigator mounted in the vehicle.

There have been used conventional FM-multiplex broadcast receiving devices which search broadcasting stations whose radio-waves have field strengths higher than a certain preset level and automatically selects a suitable one.

The above-mentioned FM-multiplex-broadcast receivers, however, encounter such a problem that traffic information or general information supplied by the VICS utilizing a FM-multiplex broadcast is digitally coded information and, therefore, a received group of data (a packet) may become unusable if it contains an error that can not be corrected. This reduces a correct reception ratio of the broadcast.

Since a FM-multiplex broadcast sends traffic information and general information by using sub-carriers (space) available in the FM broadcast, the reception of the traffic and other general information transmitted by the sub-carrier may sometimes be affected by noise having neighboring frequencies while the main FM broadcast can be received with a sufficient electric field strength.

Consequently, there still remains a problem that traffic and general information supplied by VICS can not sufficiently be received by automatically searching and selecting any one of stations whose broadcasts have an electric field strength higher than a specified level at the receiving place.

SUMMARY OF THE INVENTION

The present invention relates to a mobile FM-multiplex-broadcast receiving device for receiving traffic and other general information transmitted as digital information signals of FM-multiplex broadcasts. Accordingly, one of the present invention is provide a mobile FM-multiplex-broadcast receiving device which is capable of receiving traffic information and other general information transmitted as digital information signals of the FM-multiplex-broadcasts at a sufficient correct reception ratio by determining a ratio of correctly received digital signals to a total of received signals for each received station and by selecting a station or stations whose correct reception ratios are higher than a specified level.

DESCRIPTION OF PREFERRED EMBODIMENTS

Figure 1:
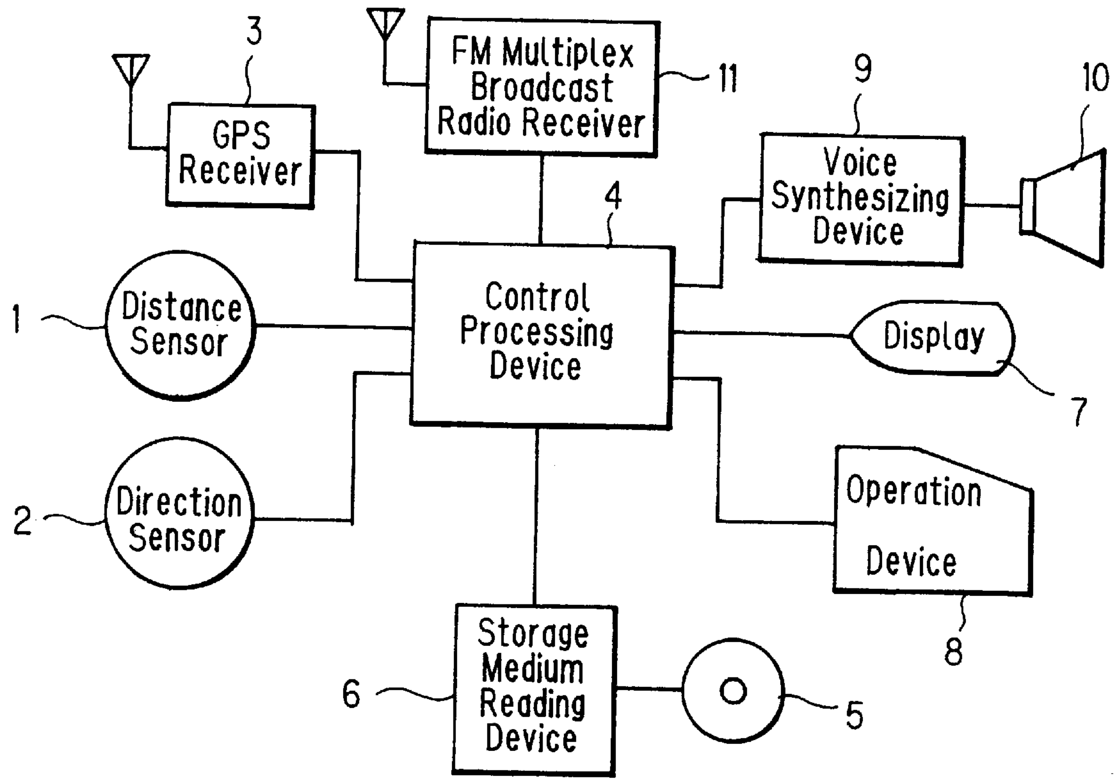
FIG. 1 is a block diagram showing an exemplified construction of a navigation system in which an embodiment of the present invention is applied.

Referring to FIG. 1, a preferred embodiment of the present invention will be described below by way of example for use with a navigation device mounted in a vehicle.

The navigation device used in a vehicle comprises a distance sensor 1 for detecting a running distance of the vehicle; a direction sensor 2 for detecting a running direction of the vehicle; a GSP receiver 3 for determining a current location of the vehicle; a control processing device 4 consisting of a micro-computer system which determines a current position of the vehicle on a road map by sequentially calculating X- and Y-coordinates of the current vehicle position per unit of running distance from the start point on the basis of the detected running distance and the detected running direction and/or determines a current position of the vehicle on a road-map every unit of time on the basis of GPS signals received by the GPS receiver 3, and performs the control of the whole navigation system with necessary data processing; a road-map information storage medium 5 for storing digitized road-map information; a storage-medium reading device 6 for selectively reading road-map information of a specified area from the storage medium 5; a display 7 for displaying the selected area road-map on a display screen on the basis of the read-out road-map information and renewably displaying a mark indicating a current position on the road-map moving as the vehicle travels; and an operation control unit 8 for providing the control processing device 4 with operation commands including commands for selecting a desired road map to be presented on the display 7, setting a target point for the vehicle on the road map and changing settings for the display, e.g., a magnification factor of the screen image.

The control processing device 4 searches an optimal course between a start point and a target point preset on a road map by evaluating travel-cost-related variables such as travelling distance and travelling time with due consideration of traffic regulations such as one-way traffic on the basis of digitized road-map data read from the map information storage medium.

The control processing device 4 indicates the searched optimal course on the road map indicated on the display screen and guides the vehicle to follow the indicated optimal course, providing a driver with visual and/or voice instructions for, e.g., "turn to the right or the left" and "off-route alarm" on the screen and/or through a speaker 10 from a voice synthesizer 9.

The above-mentioned optimal course from a start point to a target point can be searched by using a known conventional algorithm.

In the above-described vehicle navigation device, it is possible to provide the control processing device with a FM-multiplex radio receiver 11 for receiving traffic information and/or general information provided by a VICS, which is digital information transmitted over general FM multiplexed channels from a plurality of FM broadcasting stations (not shown). In this system, the control processing device 4 performs data processing operations for selecting a FM-broadcasting station and receives information according to an instruction input from an operation device 8 (including touch switches indicated on a display panel).

Traffic and general information to be provided by the VICS is composed of packets of one-frame-structure digital signals, each of which is transmitted with an error correcting code.

The VICS provides traffic information which relates to specified roads such as state roads, prefectural roads and highways (to save a total amount of traffic information) and which includes information on traffic situation (queue and delay time) for relevant roads and information on traffic regulations, e.g., roadblocking or laneblocking because of traffic accidents, road construction works, speed limits because of storm, snowfall, etc.

General information is text information describing news and weather forecasts.

The VICS traffic information and general information are periodically updated and broadcast by each FM-broadcasting station.

The control processing device 4 indicates a text image (e.g., news or a weather report) on the screen of the display 7 by using the information received by the FM-multiplex-broadcast receiving device 11 according to an instruction input from the operation device 8. The control processing device 4 also operates the display 7 to selectively indicate symbols for describing various kinds of traffic information on a road map indicated on the display screen.

With an instruction input from the operation device 8, the control processing device 4 searches an optimal course from a start point to a target point avoiding jammed roads and blocked places according to the received VICS information.

Figure 2:
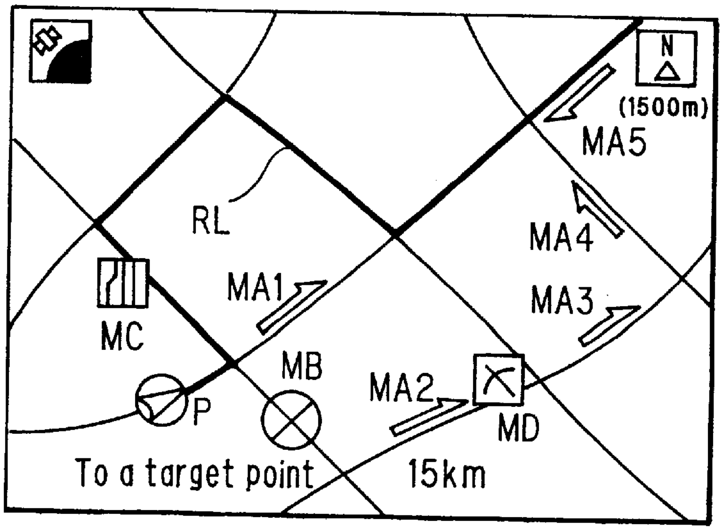
FIG. 2 is an a view showing an exemplified display screen of a navigation device, on which a content of traffic information supplied by a VICS is indicated with marks.

As shown in FIG. 2, the received traffic information is presented by marks, e.g., MA (MA1, MA2, MA3 . . . ) denoting a jammed road, MB indicating a blocked point, MC indicating a road with the reduced number of lanes, MD denoting a place where road construction works being conducted, etc. An optimal course from a start point to a target point, which has been searched avoiding the jammed route and the blocked place, is presented by a mark RM on a road map indicated on the display screen.

In the above-mentioned system, the FM-multiplex-broadcast receiving device 11 according to the present invention starts, as soon as switched on, sequential searching of FM-broadcasting stations having electric field strengths higher than a specified level thereat, determining at the same time a correct reception ratio of received digital information for each searched FM-station under the control of the control processing device 4. On the basis of the correct reception ratios of the searched stations, which have been determined by the FM-multiplex radio-receiver 11, the control processing device 4 informs a driver of selectable FM broadcasting stations. The control processing device 4 causes the radio-receiver 11 to repeat periodical scanning for searching selectable FM-broadcasting stations at a certain interval (e.g., every 20 min.).

The correct reception ratio of digital information is a ratio of an amount of correctly received data to a total amount of received data. This ratio can be determined as a ratio of an amount (the number of packets) of correctly received data to a total amount (a total number of packets) of data received for a certain specified time (e.g., 5 seconds) taken for receiving one frame of VICS information.

Correct Reception Ratio=Amount of Correctly Received Data/Total Amount of Received Data The FM-multiplex-broadcast receiving device 11 decides whether data was correctly received by checking error detecting codes (CRC) and parity bits in received packet data and parity packets inserted among a plurality of data packets.

Figure 3:
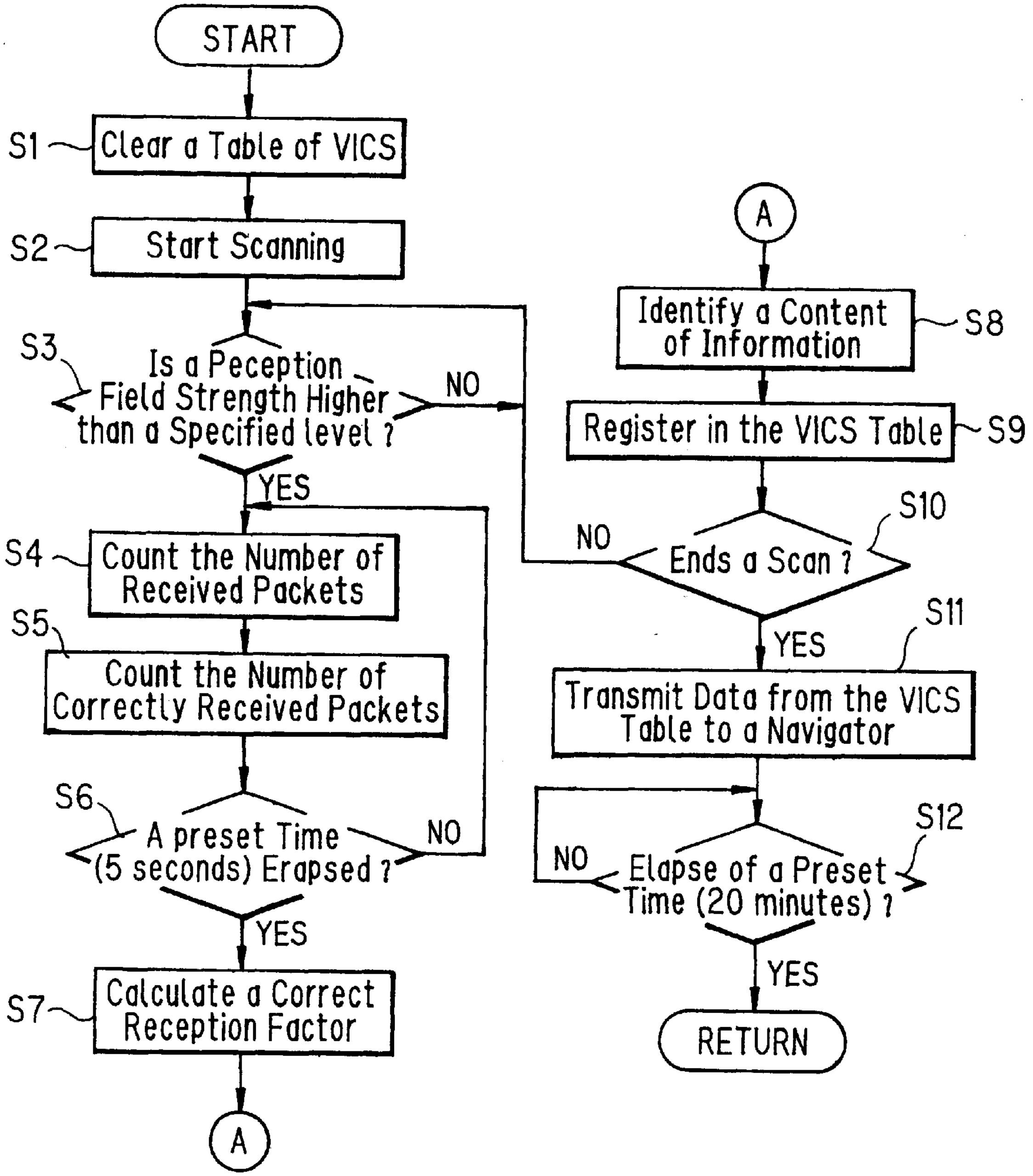
FIG. 3 is a flow chart describing an example of processing operations of a FM-multiplex-broadcast receiving device in determining the correct reception ratio of a FM-broadcast by scanning the broadcasting signals.

FIG. 3 is a flow chart describing processing steps to be performed by the FM-multiplex-broadcast receiving device 11.

As soon as the power switch was turned on, the receiving device 11 clears a VICS table of its internal memory (Step S1), starts scanning for sequentially searching a plurality of FM broadcasting stations (Step S2) and determines whether each searched FM-broadcasting station can be received with an electric field strength higher than a certain specified level thereat (Step S3).

If the electric field strength of the searched FM-broadcasting station was lower than the specified level, the receiving device 11 continues sequential scanning until a FM-broadcasting station whose radio-wave has an electrical field strength higher than the specified level is received.

When the electric field strength of the searched FM-broadcasting station was higher than the specified level (at Step S3), the receiving device 11 counts up received packets (Step S4) and determines the number of correctly received (with no bit error) packets (Step S5).

The radio-receiver 11 recognizes the elapse of a specified time (e.g., 5 seconds) necessary for receiving information by one frame (Step 6) and determines a correct reception ratio of the received packets (Step S7).

At the same time, the receiving device 11 discriminates whether information received from the searched FM-broadcasting station is traffic information or general information or includes both kinds of information (Step S8).

The receiving device 11 writes the correct reception ratio of the FM-broadcasting station received with an electric field strength higher than the specified level and a list of receivable information into the VICS table (Step S9).

The receiving device 11 determines whether scanning is completed, i.e., all FM-broadcasting stations were searched (Step S10). If not, the radio-receiver 11 continue searching of a subsequent FM-broadcasting station whose electric field strength is higher than the specified level. On completion of the scanning operation, the receiving device transfers all data from the VICS table to the control processing device (Step S11).

An exemplified list of FM-broadcasting stations written in the VICS table is shown below in Table 1.

TABLE 1

| No. | Frequency | Kinds of Information | Correct Reception Ratio |
|---|---|---|---|
| 1 | 76.4 MHz | General Information | 85% |
| 2 | 80.0 MHz | General Information | 90% |
| 3 | 81.9 MHz | Traffic/General Information | 70% |
| 4 | 82.5 MHz | Traffic/General Information | 80% |
| 5 | 85.1 MHz | Traffic/General Information | 30% |

The control processing device recognizes whether a specified time (e.g., 20 minutes) elapsed after completion of the preceding scanning (Step S12) and causes the receiving device to clear off the VICS table and start again scanning operation.

Upon receipt of the records of the VICS table from the receiving device 11, the control processing device 4 selects the FM-broadcasting stations receivable with their electric field strengths higher than a certain specified level and with correct reception ratios not smaller than a specified value (e.g., 40%) and indicates them in the descending order of their correct reception ratios on the display screen. The driver can select any desired one of the FM-broadcast stations receivable with the correct reception ratio not smaller than the specified value.

It is also possible for the driver to previously select either of traffic information and general information by inputting a selection signal into the control processing device 4 through the operation device 8. In this case, the control processing device 4 causes the display to indicate only the FM-broadcasting stations which supply the selected kind of information and satisfy the above-mentioned requirements.

In automatic selection mode selected from the operation device 8, the control processing device 4 automatically selects a FM-broadcasting station of the largest correct-reception-ratio among the FM-broadcasting stations receivable with electric field strength higher than the specified level.

Figure 4:
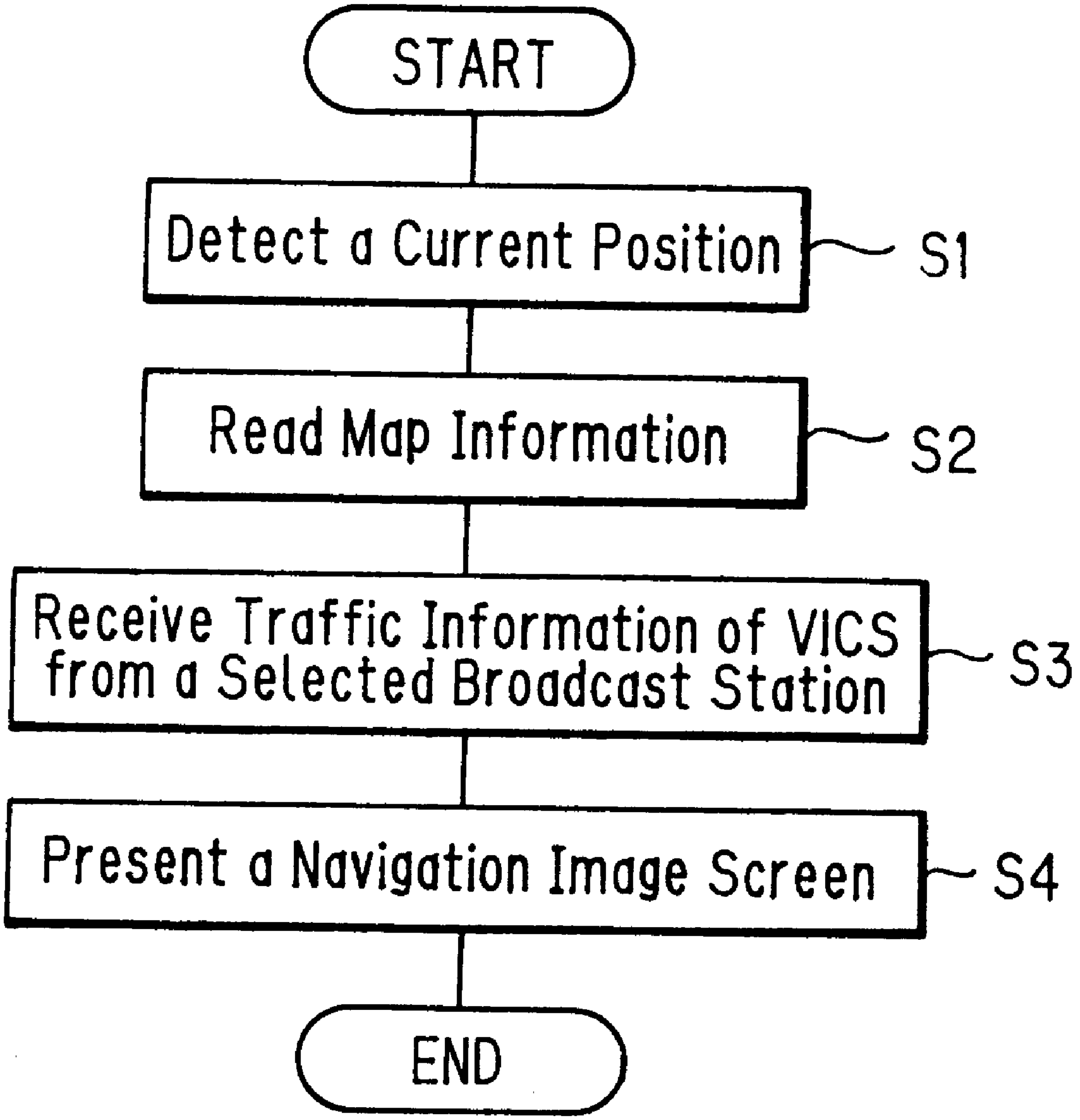
FIG. 4 is a flow chart representing a sequence of operations for displaying a navigation image of detailed road map with traffic information indicated thereon on a display screen.

FIG. 4 is a flow chart describing the sequential operation of the control processing device 4 for presenting a navigation image of the VICS level 3, i.e., indicating traffic information on a detailed road map indicated on a display screen.

The control processing device 4 detects first a current position of a vehicle wherein a navigation system is mounted (Step S1) and reads the road-map information of the area wherein the vehicle is located (Step S2). The control processing device 4 receives traffic information through the FM-multiplex-broadcast receiving device 11 from a FM-broadcasting station that has been selected manually or automatically in the above-described manner (Step S3) and presents a navigation image of the VICS level 3 on a display screen (Step S4).

Figure 5:
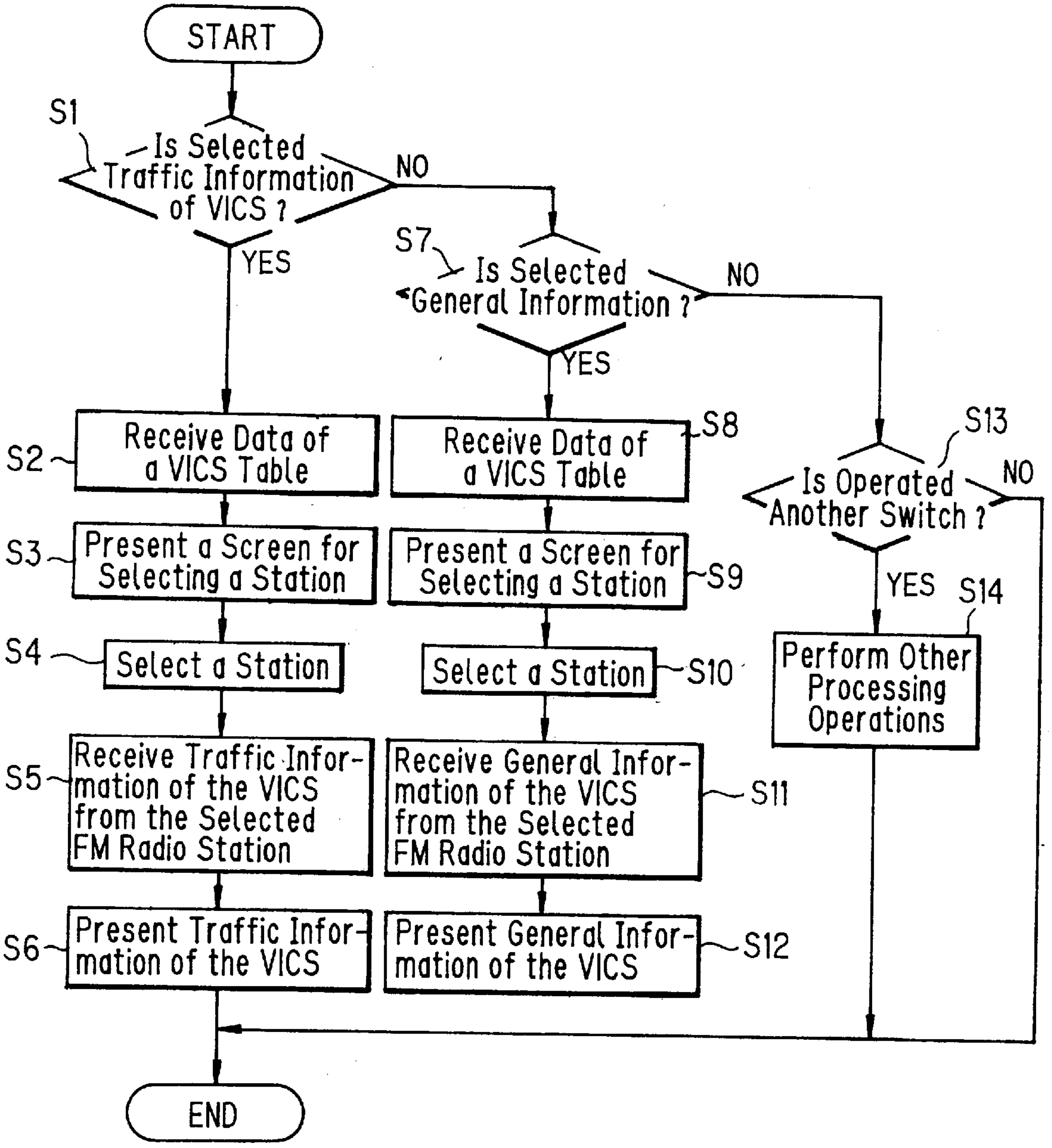
FIG. 5 is a flow chart representing a sequence of operations for selectively displaying traffic information or general information which is supplied by a VICS depending upon the selection of a user on a VICS display menu.

FIG. 5 is a flow chart describing the sequential operation of the control processing device 4 for presenting traffic information or general information supplied by the VICS according to a selecting signal input through the operation device 8.

The control processing device 4 determines whether traffic information is selected or not (Step S1). If selected, the control processing device 4 receives data of the VICS table (Step S2) and indicates a list of selectable FM-broadcasting stations on a display screen (Step S3). The control processing device 4 selects a FM-broadcasting station designated by the driver by using a corresponding touch switch (Step S4), receives traffic information of the VICS from the selected FM-broadcasting station (Step S5) and indicates the content of the received traffic information at the level 1 or 2 on the display screen (Step S6).

The control processing device determines whether general information is selected or not (Step S7). If selected, the control processing device 4 receives data of the VICS table (Step S8) and indicates a list of selectable FM-broadcasting stations on a display screen (Step S9). The control processing device 4 selects a FM-broadcasting station designated by a corresponding touch switch (Step S10), receives general information from the selected FM-broadcasting station (Step S11) and indicates the general information such as news and weather forecast on the display screen (Step S12).

With no signal for selecting traffic information or general information, the control processing device 4 examines whether other switch is operated (Step 13). If another switch is operated, the control processing device 4 performs the other designated operation (Step S14). The processing operation is finished if any other switch is not turned on.

As is apparent from the foregoing, the present invention is directed to provide a mobile FM-multiplex-broadcast receiving device for receiving traffic information (VICS) and general information transmitted as digital information signals of FM-multiplex broadcast, which can determine a correct reception ratio of the received digital information by calculating a ratio of an amount of correctly received data to a total amount of received data and allows the selection of FM-broadcasting stations having correct reception ratios greater than a specified value. Accordingly, the mobile FM-multiplex-broadcast receiving device according to the present invention can surely select a well-receivable FM-broadcasting station, thus offering advantages of quickly obtaining a sufficient amount of necessary information. In other words, the use of the FM-multiplex-broadcast receiving device may release a driver from failing in selection of a FM-multiplex broadcast.

I claim:

1. A mobile FM-multiplex-broadcast receiving device for receiving traffic information and general information which are transmitted as digital information signals of FM-multiplex broadcasts, comprising:

means for determining a correct reception ratio for each FM-multiplex broadcast by calculating a ratio of an amount of correctly received digital information to a total amount of received digital information; and means for allowing a user to select any one of FM-broadcasting stations having correct reception ratios higher than a specified value.

2. A mobile FM-multiplex-broadcast receiving device as defined in claim 1, further comprising means for searching FM-broadcasting stations having electric field strengths greater than a specified value, means for determining said ratio of correctly received digital-information amount to the total amount of received digital information from each of the searched stations and means for informing a user of selectable FM-broadcasting stations on the basis of the determined correct reception ratios.

3. A mobile FM-multiplex-broadcast receiving device as defined in claim 1, further comprising means for searching FM-broadcasting stations having electric field strengths greater than a specified value, means for determining said ratio of the amount of correctly received digital information to the total amount of received digital information from each of the searched stations and means for automatically receiving a FM-broadcasting station having the largest correct reception ratio.

* * * * *